(No Model.)
F. J. FAIRCHILD.
HAND TRUCK.
No. 425,871. Patented Apr. 15, 1890.
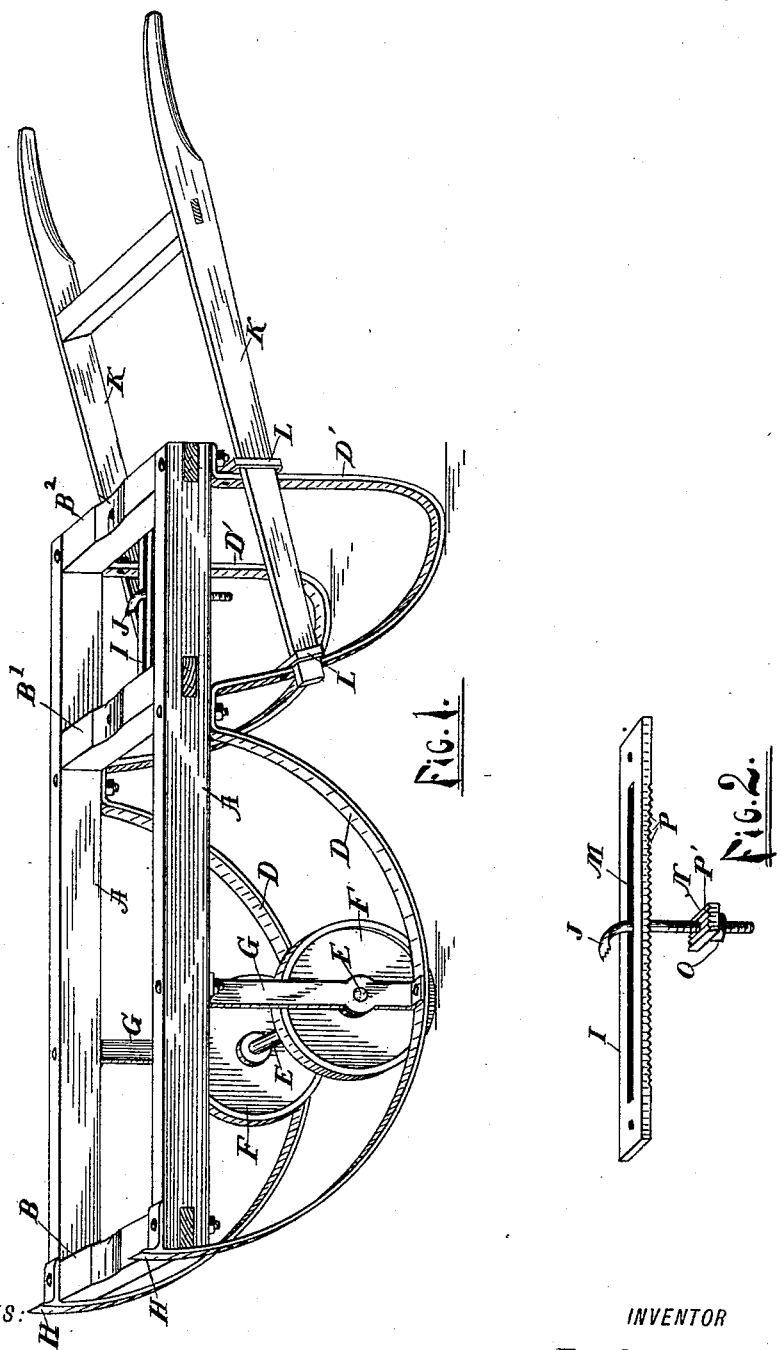
WITNESSES:
INVENTOR
Frank J. Fairchild
BY
Moulton + Rogers,
ATTORNEYS.

United States Patent Office.

FRANK J. FAIRCHILD, OF GRAND RAPIDS, MICHIGAN, ASSIGNOR OF ONE-HALF TO JAMES L. KYMER, OF SAME PLACE.

HAND-TRUCK.

SPECIFICATION forming part of Letters Patent No. 425,871, dated April 15, 1890.

Application filed December 21, 1889. Serial No. 334,539. (No model.)

*To all whom it may concern:*

Be it known that I, FRANK J. FAIRCHILD, a citizen of the United States, residing at Grand Rapids, in the county of Kent and State of Michigan, have invented certain new and useful Improvements in Hand-Trucks; and I do hereby declare the following to be a full, clear, and exact description of the invention, such as will enable others skilled in the art to which it appertains to make and use the same.

This invention relates to a hand-truck for moving barrels, boxes, and other articles; and the object of the invention is to produce a truck which is simple in construction and yet possessing great lifting power for the handling of heavy barrels, boxes, and other packages, and provided with detachable handles, whereby the device may be used either for moving such barrels, &c., from place to place or as a permanent stand and support for such heavy articles; and it consists in the construction, combination, and arrangement of the various parts, as hereinafter described, and pointed out in the claims, reference being had to the accompanying drawings, wherein—

Figure 1 is a perspective view of the entire device, and Fig. 2 a detail of the gripping mechanism.

Like letters indicate like parts in each of the figures.

The truck consists, essentially, of a suitable frame composed of longitudinal sills A A and transverse sills B B' B². Between the sills B' and B² is placed the grip-supporting bar I, having a slot M, in which is placed the gripping-hook J for gripping onto a heavy article to prevent slipping in placing it upon the truck. The under side of the bar I is provided with a notched or toothed surface P for engaging with corresponding teeth P' on the block N on the shank of hook J, which is threaded, and also provided with a nut O for the permanent adjustment of the hook J in the slot M, whereby the article may be firmly secured to the truck. The wheels F are rigidly secured upon the shaft E, which is journaled in the posts G G. A continuous bar of iron, secured to the frame at each end, forms the support of the frame and has hooks H H for gripping articles integral and forms the loops D D D' D', and is bolted to the frame between the loops. The loops D support the bar G, the other end being secured to frame A, and the loops D' form the legs upon which the rear end of the truck rests. The wheels F F are of such diameter and so adjusted as to form the forward support of the truck when horizontal and keep loops D clear of the floor. The loops L L are secured to the loops D' D' and support the handles K K, which are detachable. It will be observed that this construction is particularly effective in the loading on of heavy articles, the loop D acting as a shoe when the truck is placed perpendicular and forming a sort of rolling fulcrum to a lever, the short arm of which increases in length as the handles K K are depressed, and by its use heavy articles commonly requiring several men to handle are easily handled by one.

Having thus described the invention, what is claimed, and desired patented, is—

1. The within-described hand-truck composed of a frame consisting of sills A A and B B' B², the within-described bar secured to the frame and forming loops D D D' D', secured to the frame at each end and between the loops, the posts G G, secured between the frame and loop, forming the bearings for the shaft E, the shaft E, wheels F F, hooks H H, and handles K K, attached to said truck, substantially as described, and for the purposes set forth.

2. In a hand-truck, the combination, with a frame having sills A A B B' B², and provided with hooks H H, loops D D D' D', posts G G, shaft E, journaled in posts G G, and wheels F F, and handles K K, arranged substantially as set forth, of the bar I, secured to said frame and having the slot M, and provided with teeth P, hook J, having block N, provided with teeth P', and set-nut O, arranged substantially as described, and for the purposes set forth.

In testimony whereof I affix my signature in presence of two witnesses.

FRANK J. FAIRCHILD.

Witnesses:
DENNIS L. ROGERS,
LUTHER V. MOULTON.